US012587805B2

(12) United States Patent
Cao et al.

(10) Patent No.: US 12,587,805 B2
(45) Date of Patent: Mar. 24, 2026

(54) SOUND-FIELD CONTROL METHOD AND DEVICE, ELECTRONIC DEVICE AND COMPUTER-READABLE STORAGE MEDIUM

(71) Applicant: AAC Technologies (Nanjing) Co., Ltd., Nanjing (CN)

(72) Inventors: Nan Cao, Nanjing (CN); Lijian Ye, Nanjing (CN); Hongxing Wang, Nanjing (CN)

(73) Assignee: AAC Technologies (Nanjing) Co., Ltd., Nanjing (CN)

(*) Notice: Subject to any disclaimer, the term of this patent is extended or adjusted under 35 U.S.C. 154(b) by 272 days.

(21) Appl. No.: 18/335,989

(22) Filed: Jun. 15, 2023

(65) Prior Publication Data

US 2024/0214762 A1 Jun. 27, 2024

Related U.S. Application Data

(63) Continuation of application No. PCT/CN2023/090929, filed on Apr. 26, 2023.

(30) Foreign Application Priority Data

Dec. 21, 2022 (CN) ........................ 202211653554.2

(51) Int. Cl.
*H04S 7/00* (2006.01)

(52) U.S. Cl.
CPC .......... *H04S 7/303* (2013.01); *H04S 2400/15* (2013.01)

(58) Field of Classification Search
None
See application file for complete search history.

(56) References Cited

U.S. PATENT DOCUMENTS

| | | | | |
|---|---|---|---|---|
| 2019/0208322 A1* | 7/2019 | Chapman | H04R 1/26 | |
| 2022/0377461 A1* | 11/2022 | Duraiswami | H04R 3/04 | |
| 2023/0119651 A1* | 4/2023 | Liao | H04R 1/028 | 381/1 |
| 2023/0319480 A1* | 10/2023 | Wang | H04R 5/04 | 381/300 |

FOREIGN PATENT DOCUMENTS

| | | | |
|---|---|---|---|
| CN | 117319889 A | * | 12/2023 |
| WO | WO-2023240467 A1 | * | 12/2023 |

* cited by examiner

*Primary Examiner* — Qin Zhu
(74) *Attorney, Agent, or Firm* — Wiersch Law Group

(57) ABSTRACT

This application provides a sound-field control method and device, an electronic device and a computer-readable storage medium. The method includes: obtaining a target sound field parameter, calculating a control parameter of a sound-generating device according to the target sound field parameter, and controlling operation of the sound-generating device according to the control parameter.

7 Claims, 5 Drawing Sheets

SOUND-FIELD CONTROL METHOD AND DEVICE, ELECTRONIC DEVICE AND COMPUTER-READABLE STORAGE MEDIUM

TECHNICAL FIELD

The present application relates to acoustic techniques, and more particularly to a sound-field control method and device, an electronic device, and a computer-readable storage medium.

BACKGROUND

Sound field refers to an area in the medium where sound waves exist. When the sound waves propagate in all directions from a sound-generating device, a sound field will be formed around the sound-generating device. The sound field can be characterized by various physical parameters, such as sound intensity, sound pressure and particle velocity.

The existing sound-generating devices can only form a fixed sound field when working. For the sound-generating device equipped with multiple sound-generating units, when the multiple sound-generating units work at the same time, the sound field superposition will produce an enhanced or attenuated effect in different areas. In some scenarios, one sound-generating device may need to serve multiple users at the same time, and the users may be located in different spatial locations, so that for the same audio signal, the received signal intensity may vary among the users, failing to form a sound field with a desired intensity in a specific area according to the users' needs.

SUMMARY

An object of the present application is to provide a sound-field control method and device, an electronic device, and a computer-readable storage medium, so as to at least solve the problem in the prior art that it is difficult to perform zoned control on the sound field generated by the audio signal output from the sound-generating device according to the users' actual needs.

Technical solutions of this application will be specifically described below.

In a first aspect, this application provides a sound-field control method applied to an electronic device, wherein the electronic device comprises a sound-generating device, and the sound-field control method comprises:

obtaining a target sound field parameter, wherein the target sound field parameter comprises an acoustic characteristic parameter of a target area;

calculating a control parameter of the sound-generating device according to the target sound field parameter; and controlling operation of the sound-generating device according to the control parameter.

In a second aspect, this application provides a sound-field control device applied to an electronic device, wherein the electronic device comprises a sound-generating device, and the sound-field control device comprises:

an acquisition module;

a calculation module; and a control module;

wherein the acquisition module is configured to obtain a target sound field parameter, wherein the target sound field parameter comprises an acoustic characteristic parameter of a target area;

the calculation module is configured to calculate a control parameter of the sound-generating device according to the target sound field parameter; and the control module is configured to control operation of the sound-generating device according to the control parameter.

In a third aspect, this application provides an electronic device, comprising:

a sound-generating device;

a memory; and a processor;

wherein the processor is configured to execute a computer program stored on the memory to implement steps of the sound-field control method provided in the first aspect of the present application.

In a fourth aspect, this application provides a computer-readable storage medium, wherein a computer program is stored on the computer-readable storage medium, and the computer program is configured to be executed by a processor to implement steps of the sound-field control method provided in the first aspect of the present application.

Regarding the sound-field control method and device, electronic device and computer-readable storage medium provided herein, the target sound field parameter is obtained; the control parameter of the sound-generating device is calculated according to the target sound field parameter; and the operation of the sound-generating device is controlled according to the control parameter.

Through the implementation of the technical solutions of this application, a reasonable target sound field parameter is set, and based on the target sound field parameter, individual sound-generating units in the sound-generating device are controlled to work in cooperation with each other to realize the zoned control of the sound field, such that the sound waves generated by the sound-generating device can form the desired sound field in individual target areas, and the audio signal reception requirements of multiple target users in different areas can be satisfied.

DETAILED DESCRIPTION OF THE EMBODIMENTS

The present application will be described clearly and completely below with reference to the accompanying drawings and embodiments to make objects, technical solutions, and advantages of the present application clearer and better understood. It should be understood that provided below are merely some embodiments of the present application, which are not intended to limit the present application. Other embodiments obtained by those skilled in the art based on the embodiments disclosed herein without making creative effort shall fall within the scope of the present application.

It should be understood that as used herein, the orientation or positional relationships indicated by terms "length", "width", "up", "down", "front", "back", "left", "right", "vertical", "horizontal", "top", "bottom", "inside", "outside", etc. are based on the orientation or positional relationship shown in the accompanying drawings, and these terms are used only to facilitate and simplify the description of embodiments of the present application, rather than indicating or implying that the device or element referred to must have a particular orientation, or be constructed or operated in a particular orientation. Therefore, these terms should not be construed as limiting the present application.

It should be noted that as used herein, terms "first" and "second" are merely descriptive, and are not to be construed as indicating or implying relative importance or implicitly specifying the number of technical features indicated. Thus, the features defined with "first" and "second" may explicitly or implicitly include one or more such features. As used herein, "a plurality of" means two or more, unless otherwise expressly specified.

In the description of embodiments of the present application, unless otherwise specified and defined, terms "installation", "connection", "linkage" and "fixation" should be understood in a broad sense, for example, it can be fixed connection or removable connection, or integrally formed; it can be mechanical connection, or electrical connection; it can be direct connection or indirect connection via an intermediate medium, or communication or interaction between two components. For those of ordinary skill in the art, the specific meaning of the above terms in embodiments of the present application can be understood on a case-by-case basis.

Figure 1:
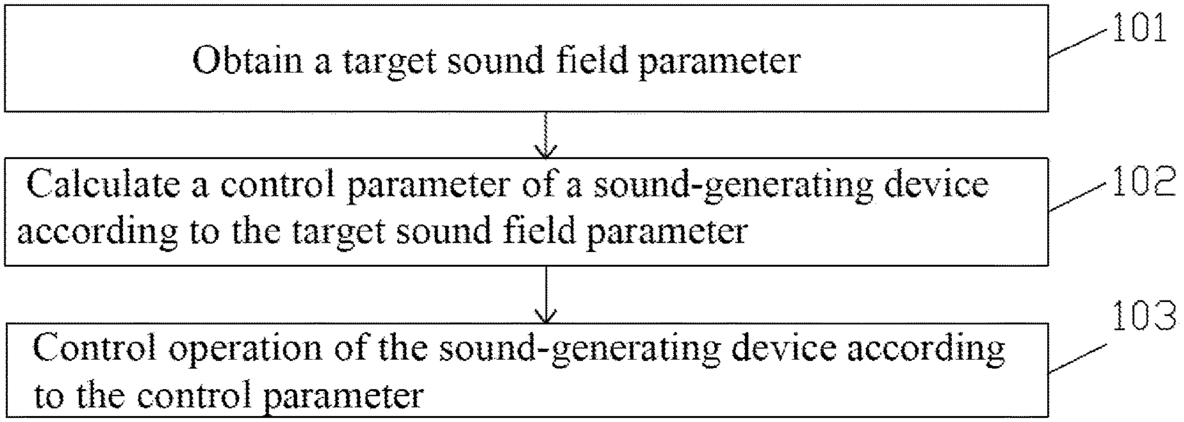
FIG. 1 is a flow chart of a basic sound-field control method provided in a first embodiment of the present application.

In order to solve the problem in the prior art that it is difficult to perform zoned control on the sound field generated by the audio signal output from the sound-generating device according to the user's actual needs, a first embodiment of the present application provides a sound-field control method applied to an electronic device including a sound-generating device. Referring to the flow chart presented in FIG. 1, the sound-field control method of this embodiment includes the following steps.

Step (101) A target sound field parameter is obtained.

Specifically, the target sound field parameter includes an acoustic characteristic parameter of a target area, and the acoustic characteristic parameter may be predetermined sound intensity, sound pressure or sound field ratio. In some implementations of this embodiments, the target sound field parameter may be fixed or variable, or may be a transfer function for characterizing the sound field characteristics.

In some embodiments, the target sound field parameter is obtained through steps of:

monitoring a function use state of the electronic device in real time; and when a switch in the function use state is monitored, determining the target sound field parameter according to a target function use state.

Specifically, during the operation of the electronic device, the audio signal can be output through a receiver or speaker. Accordingly, the function use state includes the speaker use state and the receiver use state, and different target sound field parameters are set for different function use states. When a switch in the function use state is monitored, the target sound field parameter corresponding to the target function use state is obtained to control the corresponding sound-generating device to form the desired sound field in the target area. The audio signal may be any sound signal, such as voice signal and music signal.

In another implementation of this embodiment, a controllable area of the electronic device includes a plurality of preset areas. The above step of "obtaining the target sound field parameter" includes:

obtaining location information of a target user;

determining the target area from the plurality of preset areas according to the location information; and determining the target sound field parameter according to a target control point corresponding to the target area.

Specifically, the controllable area of the electronic device refers to an area where the electronic device can perform sound field control. In this embodiment, the target user is located within the controllable area of the electronic device, and there may be one or more target users. The controllable area of the electronic device is divided into the plurality of preset areas in advance. Based on the location information, it can be determined which preset area the target user is in, and then the preset area where the target user is located is determined as the target area. In addition, in some implementations of this embodiment, when the target user is located on a common boundary of two adjacent preset areas, the corresponding two preset areas are both identified as target areas. In this embodiment, each preset area corresponds to a control point, and after the target area is determined, the target control parameter can be determined based on the target control point corresponding to the target area.

In another implementation of this embodiment, the target user includes a first target user and a second target user, and the target area includes a perception-allowed area corresponding to the first target user and a sound field cancellation area corresponding to the second target user. The above step of "determining the target sound field parameter according to the target control point corresponding to the target area" includes:

determining a sound field enhancement characteristic parameter corresponding to a target output audio signal according to a first target control point corresponding to the perception-allowed area, and determining a sound field cancellation characteristic parameter corresponding to a sound field-cancelling sound wave according to a second in target control point corresponding to the sound field cancellation area; where the sound field enhancement characteristic parameter and the sound field cancellation characteristic parameter form the target sound field parameter.

Specifically, in view of the privacy security, in some implementations of this embodiment, in order to make the sound-generating device work in such a way that some users can receive the audio signal output thereby, and the remaining users cannot receive such audio signal, the sound-generating device equipped with a plurality of sound-generating units is employed to perform sound field control through steps of: obtaining the target sound field parameter consisting of the sound field enhancement characteristic parameter and the sound field cancellation characteristic parameter; calculating a control parameter according to the target sound field parameter; and controlling, according to the control parameter, audio signals output by the sound-generating units to experience superposition in the perception-allowed area to form a sound field and to experience cancellation in the sound field cancellation area, thereby enabling the sound field control. In this embodiment, the first target user is a target user that can receive the audio signal output by the sound-generating device, and the second target user is a target user that does not need or is not allowed to receive the audio signal. After determining the sound field enhancement characteristic parameter of the target area corresponding to the first target user and the sound field cancellation characteristic parameter of the target area corresponding to the second target user, the control parameter of the corresponding target area can be calculated based on the sound field enhancement characteristic parameter or sound field cancellation characteristic parameter, and then the sound-generating is controlled based on the control parameter to work such that the first target user who needs to receive the audio signal can perceive the audio signal output by the sound-generating device, while the second target user who does not need or is not allowed to receive the audio signal cannot perceive the audio signal output by the sound-generation device.

Step (102) A control parameter of the sound-generating device is calculated according to the target sound field parameter.

Specifically, in this embodiment, the control parameter of the sound-generating device can be calculated by a time domain system or a frequency domain system according to the obtained target sound field parameter. The sound-generating device may be a sound-generating device on a mobile phone, a smart earphone, or other devices.

In one implementation of this embodiment, the sound-generating device includes one or more sound-generating units, and the control parameter includes a target control parameter of each sound-generating unit. The above step of "calculating the control parameter of the sound-generating device according to the target sound field parameter" includes:

according to a preset constraint condition, inputting the target sound field parameter into a preset calculation formula to find an optimal solution to obtain a target control parameter of a target sound-generating unit in the sound-generating device;

where the preset calculation formula is expressed as:

$$F = \sum_{i=1}^{N} a_i * \left| \left( H_{i1} - \sum_{j=1}^{M} H_{ij2} * H_{jc} \right) \right|,$$

$$|H_{jc}| < A_{limit};$$

where F indicates an objective function; $H_{i1}$ indicates a target sound field parameter of an $i^{th}$ target control point; $H_{ij2}$ indicates a rated sound field parameter of a $j^{th}$ sound-generating unit when operating at the $i^{th}$ target control point; $H_{jc}$ indicates a control parameter of the $j^{th}$ sound-generating unit; $A_{limit}$ indicates a maximum amplitude of the sound-generating device; $a_i$ indicates a weight of individual target control points; N indicates the number of target control points; and M indicates the number of the plurality of sound-generating units.

Further, in one implementation of this embodiment, the step of "according to a preset constraint condition, inputting the target sound field parameter into a preset calculation formula to find an optimal solution to obtain a target control parameter of a target sound-generating unit in the sound-generating device" includes:

inputting the target sound field parameter into the preset calculation formula for calculation to obtain a plurality of function values; and with minimization of an objective function as the preset constraint condition, determining a control parameter corresponding to a minimum function value of the objective function as the target control parameter of the target sound-generating unit in the sound-generating device.

Specifically, within an adjustable amplitude range of the sound-generating device, each sound-generating unit is preset with a plurality of control parameters. The process of an optimal solution of the target control parameter of one of the units is exemplarily described as follows. Individual control parameters of the sound-generating unit are substituted into the preset calculation formula to obtain objective function values respectively corresponding to the control parameters, and the control parameter corresponding to the minimum among the obtained objective function values is determined as the target control parameter of the sound-generating unit.

Step (103) The sound-generating device is controlled to work according to the control parameter.

Specifically, during the operation of the sound-generating device, the sound-generating units are controlled to work according to their respective target control parameters, so as to form the desired sound field in the target area.

In one implementation of this embodiment, after the step of "controlling the operation of the sound-generating device according to the control parameter", the sound-field control method further includes:

collecting an actual sound field parameter of individual target control points;

calculating a difference evaluation index between the actual sound field parameter and the corresponding target sound field parameter; and comparing the difference evaluation index with a preset threshold; when the difference evaluation index is equal to or larger than the preset threshold, adjusting the control parameter according to the difference evaluation index; and controlling operation of the sound-generating device according to an adjusted control parameter.

Figure 2:
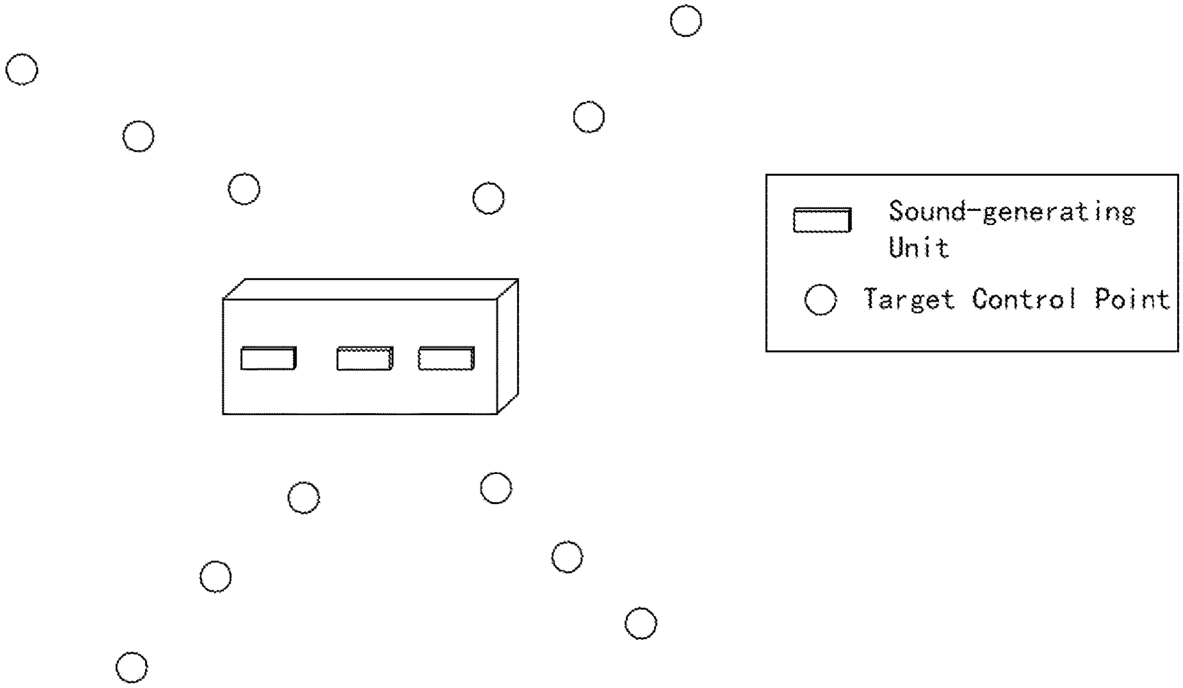
FIG. 2 schematically shows a working principle of a sound-generating device provided in the first embodiment of the present application.

Specifically, the electronic device further includes a monitoring module configured to collect the actual sound field parameter of the target control point. FIG. 2 is a schematic diagram of the sound-generating device provided in the first embodiment of the present application, where the target control point may be a control point around the device in any direction, and can be determined based on the location information of the target user. Taking one of the target control points as an example, when the difference evaluation index between the actual sound field parameter and the corresponding target sound field parameter is greater than or equal to a preset threshold (that is, the difference between the actual sound field parameter and the corresponding target sound field parameter is too large), it is required to adjust the control parameter according to the difference evaluation index. The sound-generating device is controlled according to the adjusted control parameter to work such that the audio signal output by the sound-generating device forms the desired sound field in the target area.

Based on the technical solutions of the preceding embodiment of the present application, the sound field parameter is obtained; the control parameter of the sound-generating device is calculated according to the target sound field parameter; and the sound-generating device is controlled to work according to the control parameter. Through the implementation of the technical solutions provided herein, a reasonable target sound field parameter is set, and based on the target sound field parameter, the sound-generating units in the sound-generating device are controlled to work in cooperation with each other to realize the zoned control of the sound field, such that the acoustic waves emitted from the sound-generating device can form the desired sound field in individual target areas, thereby simultaneously meeting the audio signal reception needs of multiple target users in different areas.

Figure 3:
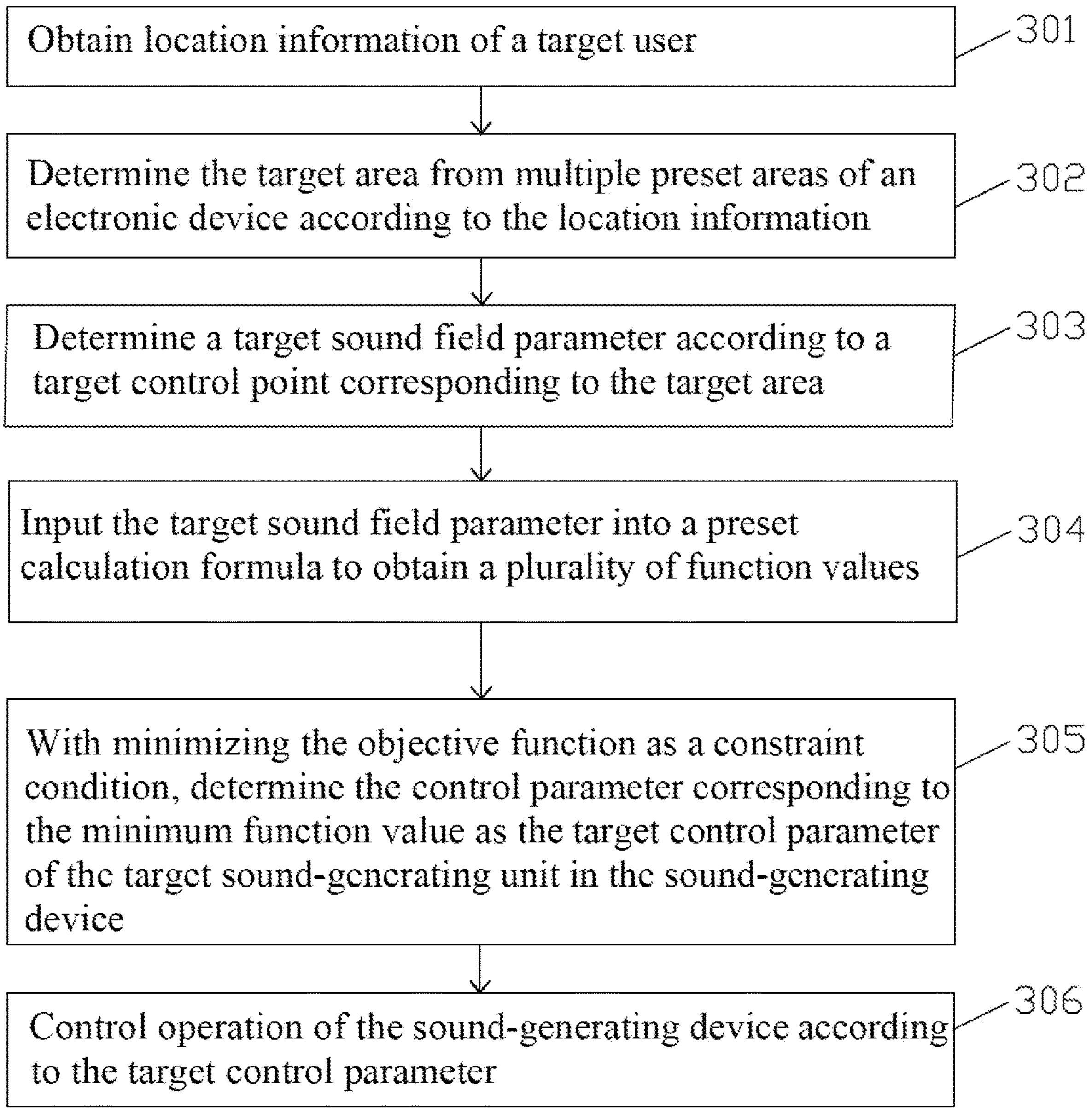
FIG. 3 is a flow chart of a detailed sound-field control method provided in a second embodiment of the present application.

The second embodiment of this application provides a detailed sound-field control method (as shown in FIG. 3) applied to an electronic device including a sound-generating device, which includes the following steps.

Step (301) Location information of a target user is acquired.

Step (302) A target area is determined accordingly from a plurality of preset areas of the electronic device based on the location information.

Specifically, the target user is located in a controllable area of the electronic device, where the controllable area of the electronic device includes a plurality of preset areas. According to the location information of the target user, the preset area where the target user is located is determined as the target area.

Step (303) A target sound field parameter is determined according to a target control point corresponding to the target area.

Step (304) The target sound field parameter is input into a preset calculation formula to obtain a plurality of function values.

Specifically, the preset calculation formula is expressed as:

$$F = \sum_{i=1}^{N} a_i * \left[\left(H_{i1} - \sum_{j=1}^{M} H_{ij2} * H_{jc}\right)\right],$$

$$|H_{jc}| < A_{limit}$$

where F indicates an objective function; $H_{i1}$ indicates a target sound field parameter of an $i^{th}$ target control point; $H_{ij2}$ indicates a rated sound field parameter of a $j^{th}$ sound-generating unit when operating at the $i^{th}$ target control point; $H_{jc}$ indicates a control parameter of the $j^{th}$ sound-generating unit; $A_{limit}$ indicates a maximum amplitude of the sound-generating device; $a_i$ indicates a weight of individual target control points; N indicates the number of target control points; and M indicates the number of the plurality of sound-generating units.

Step (305) With minimizing the objective function as a constraint condition, the control parameter corresponding to the minimum function value is identified as the target control parameter of the target sound-generating unit in the sound-generating device.

Step (306) The sound-generating device is controlled to work according to the target control parameter.

Through the implementation of the technical solutions provided in this embodiment, the target area requiring sound field control is determined according to the location information of the target user; the target sound field parameter of the target area is obtained; the control parameter of the sound-generating device is calculated according to the target sound field parameter; and the sound-generating device is controlled to work according to the control parameter, thereby realizing the zoned control of the sound field and further optimizing the listening experience of the users.

It should be understood that serial numbers of the steps in this embodiment does not imply the actual execution sequence, and the execution sequence should be determined by their functions and inherent logic relationships. Therefore, the implementation of the method provided herein is not limited to the above sequence.

Figure 4:
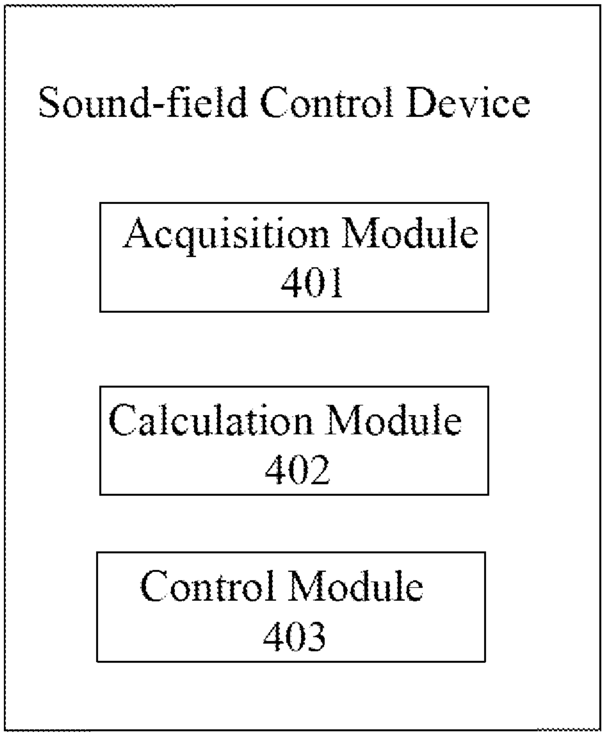
FIG. 4 is a block diagram of a sound-field control device provided in a third embodiment of the present application.

The third embodiment of this application provides a sound-field control device (as shown in FIG. 4) applied to an electronic device including a sound-generating device. The sound-field control device can be applied to the above-mentioned sound-field control methods. As shown in FIG. 4, the sound-field control device includes:

- an acquisition module 401, configured to acquire a target sound field parameter including an acoustic characteristic parameter of a target area;
- a calculation module 402, configured to calculate a control parameter of the sound-generating device according to the target sound field parameter; and
- a control module 403, configured to control operation of the sound-generating device according to the control parameter.

In some implementations of this embodiment, the acquisition module 401 is configured to monitor a function use state of the electronic device in real time; and determine the target sound field parameter corresponding to a target function use state when monitoring a switch in the function use state.

In some implementations of this embodiment, a controllable area of the electronic device includes a plurality of preset areas. The acquisition module 401 is also configured to obtain location information of a target user; determining the target area from the plurality of preset areas according to the location information; and determining the target sound field parameter according to a target control point corresponding to the target area.

In another implementation of this embodiment, the target user includes a first target user and a second target user, and the target area includes a perception-allowed area corresponding to the first target user and a sound field cancellation area corresponding to the second target user. The acquisition module 401 is configured to perform the following steps to implement the function of "determining the target sound field parameter according to the target control point corresponding to the target area":

- determining a sound field enhancement characteristic parameter corresponding to a target output audio signal according to a first target control point corresponding to the perception-allowed area, and determining a sound field cancellation characteristic parameter corresponding to a sound field-cancelling sound wave according to a second target control point corresponding to the sound field cancellation area; where the sound field enhancement characteristic parameter and the sound field cancellation characteristic parameter together form the target sound field parameter.

In some implementations of this embodiments, the sound-generating device includes one or more sound-generating units, and the control parameter includes a target control parameter of each sound-generating unit. The calculation module 402 is further configured to input the target sound field parameter into a preset calculation formula to find an optimal solution according to a preset constraint condition to obtain a target control parameter of a target sound-generating unit in the sound-generating device; where the preset calculation formula is expressed as:

$$F = \sum_{i=1}^{N} a_i * \left[\left(H_{i1} - \sum_{j=1}^{M} H_{ij2} * H_{jc}\right)\right],$$

$$|H_{jc}| < A_{limit};$$

where F indicates an objective function; $H_{i1}$ indicates a target sound field parameter of an $i^{th}$ target control point; $H_{ij2}$ indicates a rated sound field parameter of a $j^{th}$ sound-generating unit when operating at the $i^{th}$ target control point; Hic indicates a control parameter of the $j^{th}$ sound-generating unit; $A_{limit}$ indicates a maximum amplitude of the sound-generating device; $a_i$ indicates a weight of individual target control points; N indicates the number of target control points; and M indicates the number of the plurality of sound-generating units.

Further, in some implementations of this embodiment, the calculation module 402 is configured to perform the following steps to implement the function of "inputting the target sound field parameter into a preset calculation formula to find an optimal solution according to a preset constraint condition to obtain a target control parameter of a target sound-generating unit in the sound-generating device":

inputting the target sound field parameter into the preset calculation formula for calculation to obtain a plurality of function values; and with minimization of an objective function as the preset constraint condition, determining a control parameter corresponding to a minimum function value of the objective function as the target control parameter of the target sound-generating unit in the sound-generating device.

In some implementations of this embodiment, the sound-field control device further includes an adjustment module, which is configured to perform steps of:

collecting an actual sound field parameter of individual target control points;

calculating a difference evaluation index between the actual sound field parameter and the corresponding target sound field parameter; and comparing the difference evaluation index with a preset threshold; when the difference evaluation index is equal to or larger than the preset threshold, adjusting the control parameter according to the difference evaluation index; and controlling operation of the sound-generating device according to an adjusted control parameter.

Through the implementation of the technical solutions of this embodiment, the target sound field parameter is obtained; the control parameter of the sound-generating device is calculated according to the target sound field parameter; and the sound-generating device is controlled to work according to the control parameter. Through the implementation of solutions of this application, a reasonable target sound field parameter is set, and the sound-generating units in the sound-generating device are controlled based on the target sound field parameter to work in cooperation with each other to perform zoned control on the sound field, such that the sound waves emitted by the sound-generating device form the required sound field in each target area, and the audio signal reception needs for multiple target users in different areas are simultaneously satisfied.

Figure 5:
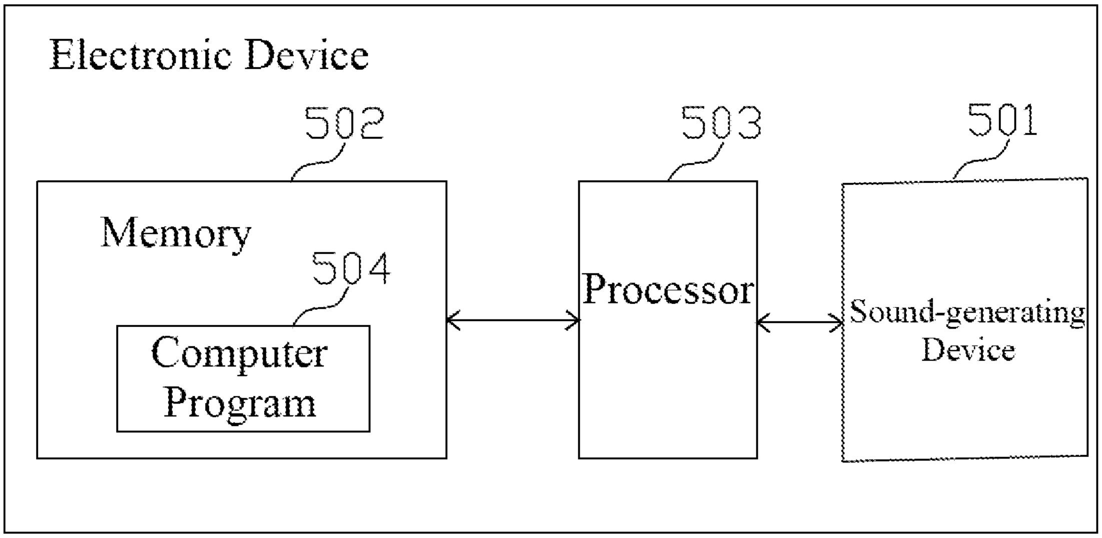
FIG. 5 structurally shows an electronic device provided in a fourth embodiment of this application.

The fourth embodiment of this application provides an electronic device (as shown in FIG. 5), which can be used to implement the sound-field control method provided in the preceding embodiments. The electronic device includes:

a sound-generating device 501;

a memory 502;

a processor 503; and a computer program 504 stored on the memory 502 and executable on the processor 503;

where the memory 502 is in communication connection with the processor 503; the processor 503 is configured to execute the computer program 504 to implement the method provided in the first or second embodiment; and the number of the processor 503 may be one or more.

The memory 502 may be a random-access memory (RAM) or a non-volatile memory, such as a disk memory. The memory 502 is configured to store an executable program code, and is coupled to the processor 503.

Further, an embodiment of this application also provides a computer-readable storage medium, which may be provided in the above electronic device. The computer-readable storage medium may be the memory in the embodiment shown in FIG. 5.

The computer-readable storage medium has a computer program stored thereon, and the computer program is configured to be executed by a processor to implement the sound-field control method in the preceding embodiments. Further, the computer-readable storage medium may also be a USB flash disk, a read-only memory (ROM), a random-access memory (RAM), a disk, a CD-ROM or other mediums that can store the program code.

Regarding the several embodiments provided herein, it should be understood that the disclosed device and method can also be implemented in other ways. For example, the above-mentioned device embodiment is merely exemplary, e.g., the module division is achieved merely based on logical function, and can be conducted in another way in the actual implementation; e.g., multiple modules or components can be combined, or integrated into another system, or some features may be ignored, or not implemented. Moreover, the mutual coupling, direct coupling or communication connection may be achieved through some interfaces, and the indirect coupling or communication connection between the components or modules may be electrical, mechanical, or other forms.

The modules illustrated as separate components may or may not be physically separated, and the components displayed as modules may or may not be physical modules, i.e., they may be located in one place or may be distributed to multiple network modules. These modules can be partially or completely selected according to practical needs to implement the technical solutions of the present embodiment.

In addition, individual functional modules in each embodiment of the present application can be integrated in a single processing module, or can be physically present separately, or two or more modules can be integrated in a single module. Such integrated modules can be in the form of hardware or a functional software module.

The integrated module, when implemented as a software functional module and sold or used as a stand-alone product may be stored in a computer-readable storage medium. It is understood that the technical solution of the present application, or part or all of the technical solution that essentially contributes to the prior art may be embodied in the form of a software product, where the software product is stored in a computer-readable storage medium, and includes several instructions to enable a computer device to implement all or part of the steps of the method disclosed in individual embodiments. The aforementioned computer-readable storage medium includes USB flash disk, removable hard disk, ROM, RAM, disk, CD-ROM, and other mediums that can store a program code.

It should be noted that the preceding method embodiments are all presented as a series of actions for simplified description, but those of ordinary skill in the art should be aware that the present application is not limited by the sequence of actions described above, as some steps of the present application can be performed in other sequences or simultaneously. Moreover, those skilled in the art should also be aware that provided herein are merely preferred embodiments of the present application, and the actions and modules involved are not all necessary for the enablement of the present application.

Individual embodiments of the application have their own focus, and for the part not described in detail in a certain embodiment, reference can be made to other embodiments.

The speaker control method and device, terminal equipment and a computer-readable storage medium of this application have been described above. Described above are only preferred embodiments of the present application, which are not intended to limit the present application. It should be noted that any variations, replacements and modifications made by those of ordinary skill in the art without departing from the spirit and scope of the present application shall fall within the scope of the present application defined by the appended claims.

What is claimed is:

1. A sound-field control method applied to an electronic device, the electronic device comprising a sound-generating device, and the sound-field control method comprising:

obtaining a target sound field parameter, wherein the target sound field parameter comprises an acoustic characteristic parameter of a target area;

calculating a control parameter of the sound-generating device according to the target sound field parameter; and controlling operation of the sound-generating device according to the control parameter;

wherein a controllable area of the electronic device comprises a plurality of preset areas; and the step of "obtaining a target sound field parameter" comprises:

obtaining location information of a target user;

determining the target area from the plurality of preset areas according to the location information; and determining the target sound field parameter according to a target control point corresponding to the target area;

wherein the sound-generating device comprises one or more sound-generating units; and the control parameter of the sound-generating device comprises a target control parameter of each of the one or more sound-generating units; and the step of "calculating a control parameter of the sound-generating device according to the target sound field parameter" comprises:

according to a preset constraint condition, inputting the target sound field parameter into a preset calculation formula to find an optimal solution to obtain the target control parameter of a target sound-generating unit in the sound-generating device;

wherein the preset calculation formula is expressed as:

$$F = \sum_{i=1}^{N} a_i * \left[\left(H_{i1} - \sum_{j=1}^{M} H_{ij2} * H_{jc}\right)\right],$$

$$|H_{jc}| < A_{limit};$$

wherein F indicates an objective function; $H_{i1}$ indicates a target sound field parameter of an $i^{th}$ target control point; $H_{ij2}$ indicates a rated sound field parameter of a $j^{th}$ sound-generating unit when operating at the $i^{th}$ target control point; $H_{jc}$ indicates a control parameter of the $i^{th}$ sound-generating unit; $A_{limit}$ indicates a maximum amplitude of the sound-generating device; $a_i$ indicates a weight of each of target control points; N indicates the number of the target control points; and M indicates the number of the one or more sound-generating units.

2. The sound-field control method of claim 1, wherein the step of "obtaining a target sound field parameter" comprises:

monitoring a function use state of the electronic device in real time; and when monitoring a switch in the function use state, determining the target sound field parameter corresponding to a target function use state after the switch.

3. The sound-field control method of claim 1, wherein the target user comprises a first target user and a second target user; and the target area comprises a perception-allowed area corresponding to the first target user and a sound field cancellation area corresponding to the second target user; and the step of "determining the target sound field parameter according to a target control point corresponding to the target area" comprises:

according to a first target control point corresponding to the perception-allowed area, determining a sound field enhancement characteristic parameter corresponding to a target output audio signal; and according to a second target control point corresponding to the sound field cancellation area, determining a sound field cancellation characteristic parameter corresponding to a sound field-cancelling sound wave;

wherein the sound field enhancement characteristic parameter and the sound field cancellation characteristic parameter form the target sound field parameter.

4. The sound-field control method of claim 1, wherein the step of "according to a preset constraint condition, inputting the target sound field parameter into a preset calculation formula to find an optimal solution to obtain the target control parameter of a target sound-generating unit in the sound-generating device" comprises:

substituting the target sound field parameter into the preset calculation formula to obtain a plurality of function values; and with minimizing the objective function as the preset constraint condition, determining a control parameter corresponding to a minimum among the plurality of function values as the target control parameter of the target sound-generating unit in the sound-generating device.

5. The sound-field control method of claim 1, wherein after the step of "controlling operation of the sound-generating device according to the control parameter", the sound-field control method further comprises:

collecting an actual sound field parameter of the target control point;

calculating a difference evaluation index between the actual sound field parameter and the target sound field parameter; and comparing the difference evaluation index with a preset threshold; when the difference evaluation index is equal to or larger than the preset threshold, adjusting the control parameter according to the difference evaluation index; and controlling the operation of the sound-generating device according to an adjusted control parameter.

6. An electronic device, comprising:

a sound-generating device;

a processor; and a memory;

wherein the processor is configured to execute a computer program stored on the memory to implement the sound-field control method of claim 1.

7. A computer-readable storage medium, wherein a computer program is stored on the computer-readable storage medium; and the computer program is configured to be executed by a processor to implement the sound-field control method of claim 1.

* * * * *